United States Patent
Worrall et al.

(10) Patent No.: US 10,035,093 B2
(45) Date of Patent: Jul. 31, 2018

(54) AIR FILTERING ASSEMBLY FOR A MOTOR VEHICLE

(71) Applicant: MANN+HUMMEL GMBH, Ludwigsburg (DE)

(72) Inventors: Jason Worrall, Portage, MI (US); Austin Jackson, Kalamazoo, MI (US); Erich Fedak, Kalamazoo, MI (US); Daniel Schmid, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 12 days.

(21) Appl. No.: 15/182,840

(22) Filed: Jun. 15, 2016

(65) Prior Publication Data
US 2017/0361256 A1    Dec. 21, 2017

(51) Int. Cl.
| | | |
|---|---|---|
| *B01D 46/00* | (2006.01) | |
| *B01D 45/00* | (2006.01) | |
| *B01D 50/00* | (2006.01) | |
| *F02B 75/22* | (2006.01) | |
| *F02M 35/024* | (2006.01) | |
| *B01D 46/52* | (2006.01) | |
| *B01D 46/10* | (2006.01) | |
| *F02M 35/02* | (2006.01) | |

(52) U.S. Cl.
CPC ....... *B01D 46/0008* (2013.01); *B01D 46/002* (2013.01); *B01D 46/103* (2013.01); *B01D 46/521* (2013.01); *F02M 35/0201* (2013.01); *F02M 35/0245* (2013.01); *F02M 35/02475* (2013.01); *B01D 2267/30* (2013.01); *B01D 2275/206* (2013.01); *B01D 2279/60* (2013.01)

(58) Field of Classification Search
CPC ........ B01D 46/00; B01D 45/00; B01D 50/00; B01D 46/0005; F02B 75/22
USPC ...... 55/385.3, 529, 480, 502, 503, 521, 497, 55/478, 479, 482, 500
See application file for complete search history.

(56) References Cited

U.S. PATENT DOCUMENTS 4,640,698 A * 2/1987 Ohishi ................. B01D 46/103
55/502
5,968,215 A * 10/1999 Webb ................. B01D 46/0002
55/385.3

(Continued)

FOREIGN PATENT DOCUMENTS

| DE | 10328002 B4 | 1/2005 |
| EP | 2676713 A1 | 6/2013 |
| WO | 2014161933 A1 | 10/2014 |

*Primary Examiner* — Robert A Hopkins
*Assistant Examiner* — Minh-Chau Pham
(74) *Attorney, Agent, or Firm* — James Hasselbeck

(57) ABSTRACT

An air filter system for a motor vehicle includes a common housing, first and second D-shaped filter elements and a common cover. The common housing defines a first airflow chamber extending between a first inlet duct and a first outlet duct and a second airflow chamber extending between a second inlet duct and a second outlet duct. The first airflow chamber is fluidly separated from the second airflow chamber. The first D-shaped filter element is disposed in the first airflow chamber for filtering air passing through the first airflow chamber. The second D-shaped filter element is disposed in the second airflow chamber for filtering air passing through the second airflow chamber. The common cover is secured to the housing and closes the first airflow chamber and the second airflow chamber.

25 Claims, 6 Drawing Sheets

(56) References Cited

U.S. PATENT DOCUMENTS

| | | | |
|---|---|---|---|
| 7,601,189 B2* | 10/2009 | Lampinen | A62B 11/00 |
| | | | 165/61 |
| 8,551,205 B2 | 10/2013 | Berisha et al. | |
| 8,920,529 B2 | 12/2014 | Disson et al. | |
| 8,940,071 B2 | 1/2015 | Enderich et al. | |
| 2002/0033010 A1* | 3/2002 | Schorn | B01D 46/002 |
| | | | 55/385.3 |
| 2005/0051375 A1* | 3/2005 | Momosaki | F02M 35/10013 |
| | | | 180/219 |
| 2009/0241868 A1* | 10/2009 | Morita | B62K 11/04 |
| | | | 123/54.4 |
| 2010/0154369 A1* | 6/2010 | Berisha | B01D 46/103 |
| | | | 55/493 |
| 2013/0152528 A1* | 6/2013 | Disson | B01D 46/0005 |
| | | | 55/480 |

* cited by examiner

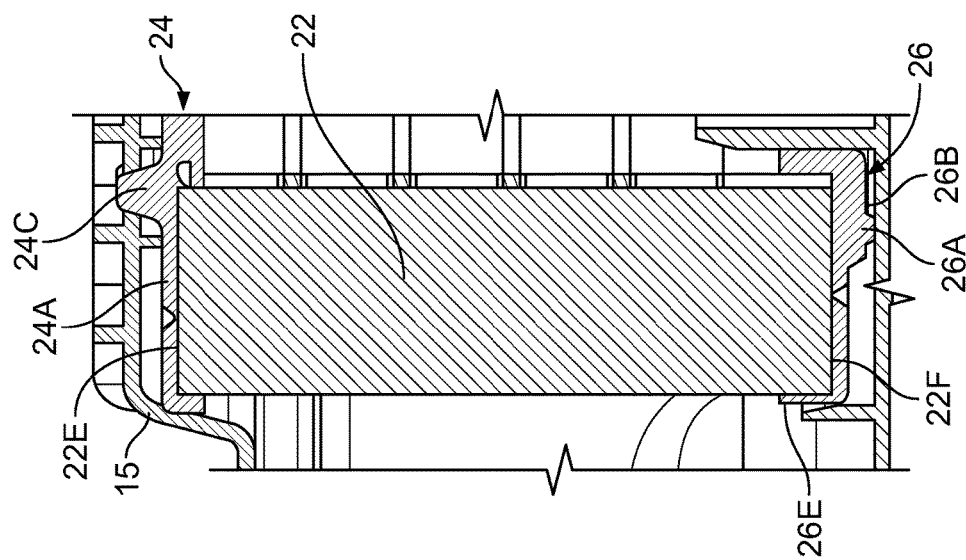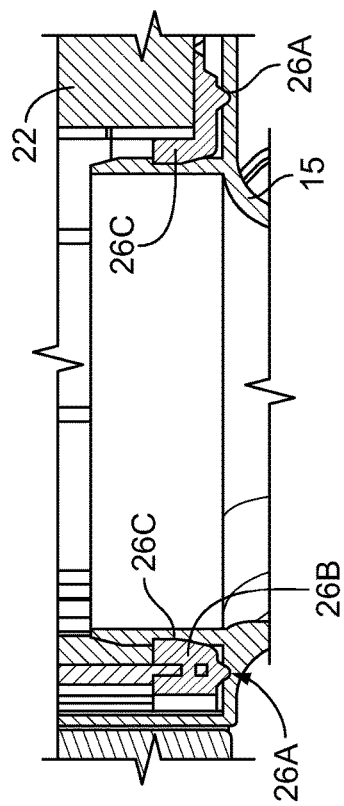

AIR FILTERING ASSEMBLY FOR A MOTOR VEHICLE

FIELD

The present teachings generally relate to an air filtering assembly for a motor vehicle. More particularly, the present teachings relate to an arcuate filter element and to a dual outlet air filtering assembly for a motor vehicle with separate airflow chambers. The present teachings also more particularly relate to a method of filtering air delivered to an internal combustion engine.

BACKGROUND

Numerous air filter system assemblies have been used to filter air delivered to an internal combustion engine of a motor vehicle. A typical air filter assembly includes a housing having a filter chamber in fluid communication with an inlet duct and an outlet duct. An air filter may be removably located in the filter chamber to filter air passing through the housing.

While known air filter systems assemblies for motor vehicles have generally proven to be satisfactory for their intended purposes, a continuous need for improvement remains in the pertinent art.

SUMMARY

In accordance with one particular application, the present teachings provide an air filter assembly for a motor vehicle including a common housing, first and second D-shaped filter elements and a common cover. The common housing defines a first airflow chamber extending between a first inlet duct and a first outlet duct and a second airflow chamber extending between a second inlet duct and a second outlet duct. The first airflow chamber is fluidly separated from the second airflow chamber. The first D-shaped filter element is disposed in the first airflow chamber for filtering air passing through the first airflow chamber. The second D-shaped filter element is disposed in the second airflow chamber for filtering air passing through the second airflow chamber. The common cover is secured to the common housing and closes the first airflow chamber and the second airflow chamber.

In accordance with another particular application, the present teachings provide an air filter element including an arcuate filter media and an end plate. The arcuate filter media has a U-shape with an open side. The arcuate filter media arcuately extends between a first end and a second end. The end plate closes the open side of the arcuate filter media by extending between the first end and the second end of the arcuate filter media and cooperating with the arcuate filter media to enclose an interior of the air filter assembly in a radial direction. The air filter element radially receives airflow through the arcuate filter media into the interior and axially directs the airflow out of the air filter element.

In accordance with yet another particular application, the present teachings provide a method of filtering air delivered to an internal combustion engine. The method includes providing a housing defining first and second airflow chambers and removably disposing first and second air filter elements in the first and second airflow chambers, respectively. The first and second airflow chambers are fluidly separated. The first airflow chamber is in communication with a first inlet duct and a first outlet duct. The second airflow chamber is in communication with a second inlet duct and a second outlet duct. The first air filter element has a first arcuate filter media and the second air filter element has a second arcuate filter media. The method additionally includes passing a first flow of air from the first inlet duct, radially through the first arcuate filter media and into an interior of the first filter element and passing a second, separate flow of air from the second inlet duct radially through the second arcuate filter media and into an interior of the second filter element. The method further includes axially delivering the first airflow from the first air filter element and the first outlet duct and axially delivering the second airflow from the second air filter element and the second outlet duct.

In accordance with still yet another particular application, the present teachings provide an arcuate filter element for filtering a fluid. The arcuate filter element includes an arcuate filter media having a first media end, an opposed second media end and an approximate U-shape therebetween. The arcuate filter media at least partially surrounds a central axis extending parallel to an axial direction and perpendicular to a radial direction. The arcuate filter media has a radially outer flow face and a radially inner flow face. The radially inner flow face at least partially surrounds an interior flow chamber of the arcuate filter element. One of the radially outer flow face and the radially inner flow face is an inflow face for receiving fluid to be filtered and the other of the radially outer flow face and the radially inner flow face is an outflow face for filtered fluid. The arcuate filter element additionally includes a first end cap and a second end cap. The first end cap is arranged on a first axial end face of the arcuate filter media. The second end cap is arranged on a second axial end face of the arcuate filter media. The arcuate filter element further includes an end plate extending between the first media end and the opposed second media end. The end plate cooperates with the arcuate filter media to radially surround and radially enclose the interior flow chamber. The interior flow chamber is open at the second end face permitting fluid flow to enter or leave the interior flow chamber.

Further areas of applicability will become apparent from the description provided herein. The description and specific examples in this summary are intended for purposes of illustration only and are not intended to limit the scope of the present disclosure.

DESCRIPTION OF THE DRAWINGS

The drawings described herein are for illustrative purposes only of selected embodiments and not all possible implementations, and are not intended to limit the scope of the present disclosure.

FIG. 5 is an enlarged view of the detail shown in Area 5 of FIG. 4.

FIG. 6 is an enlarged view of the detail shown in Area 6 of FIG. 4.

DETAILED DESCRIPTION

Figure 1:
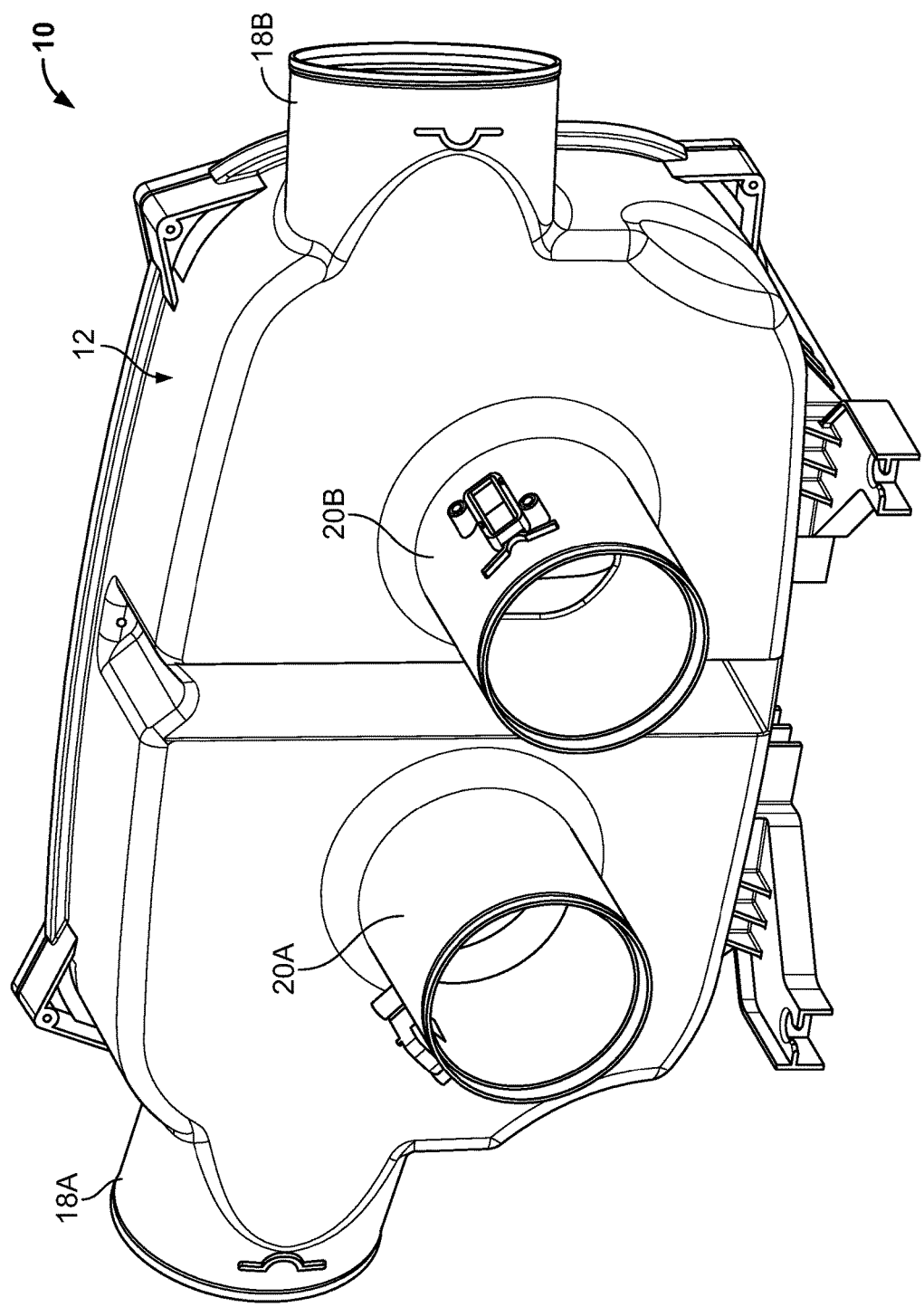
FIG. 1 is a bottom perspective view of an air filter assembly for a motor vehicle in accordance with the present teachings.
Figure 2:
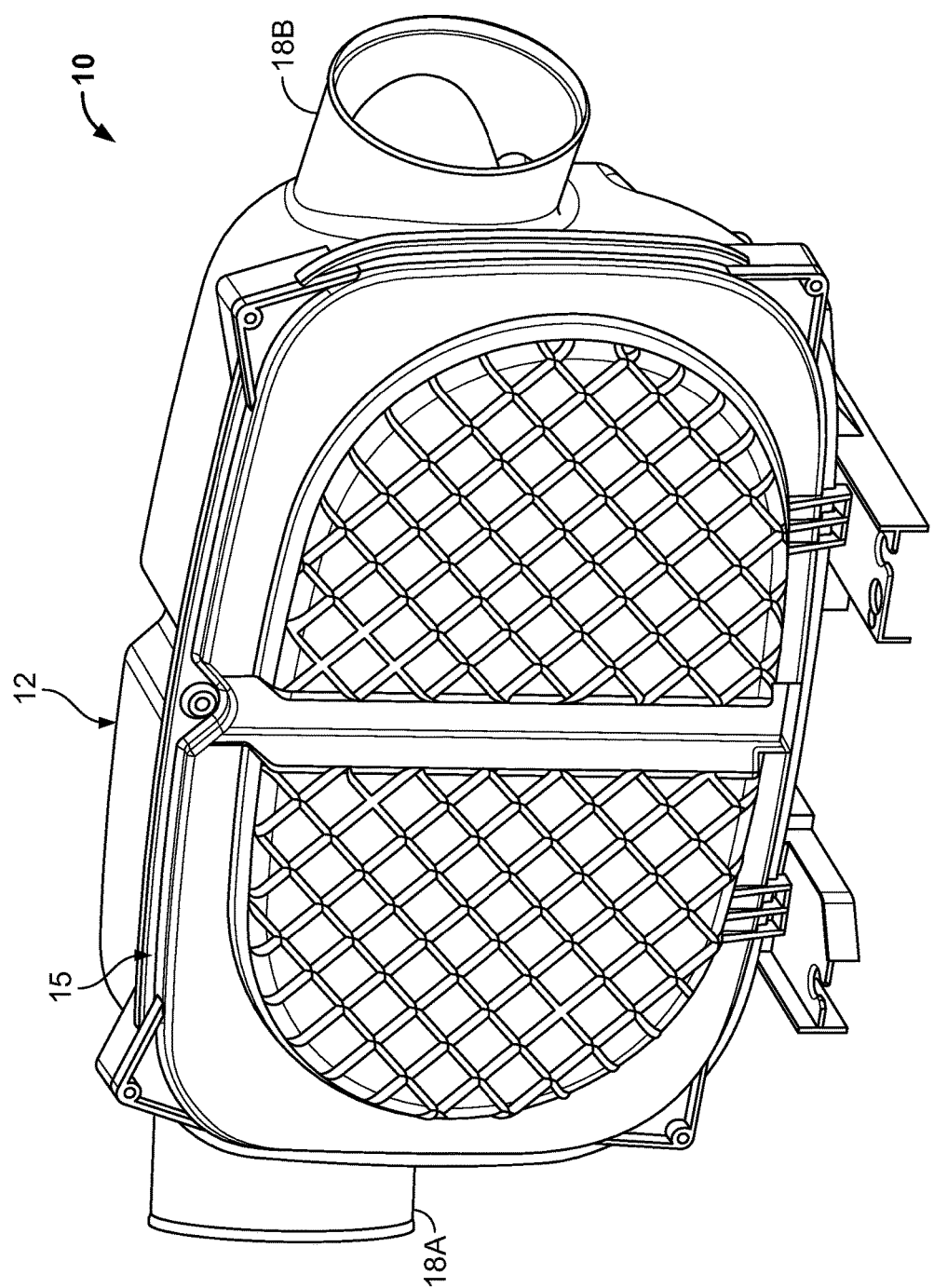
FIG. 2 is a top perspective view of an air filter assembly for a motor vehicle in accordance with the present teachings.
Figure 3:
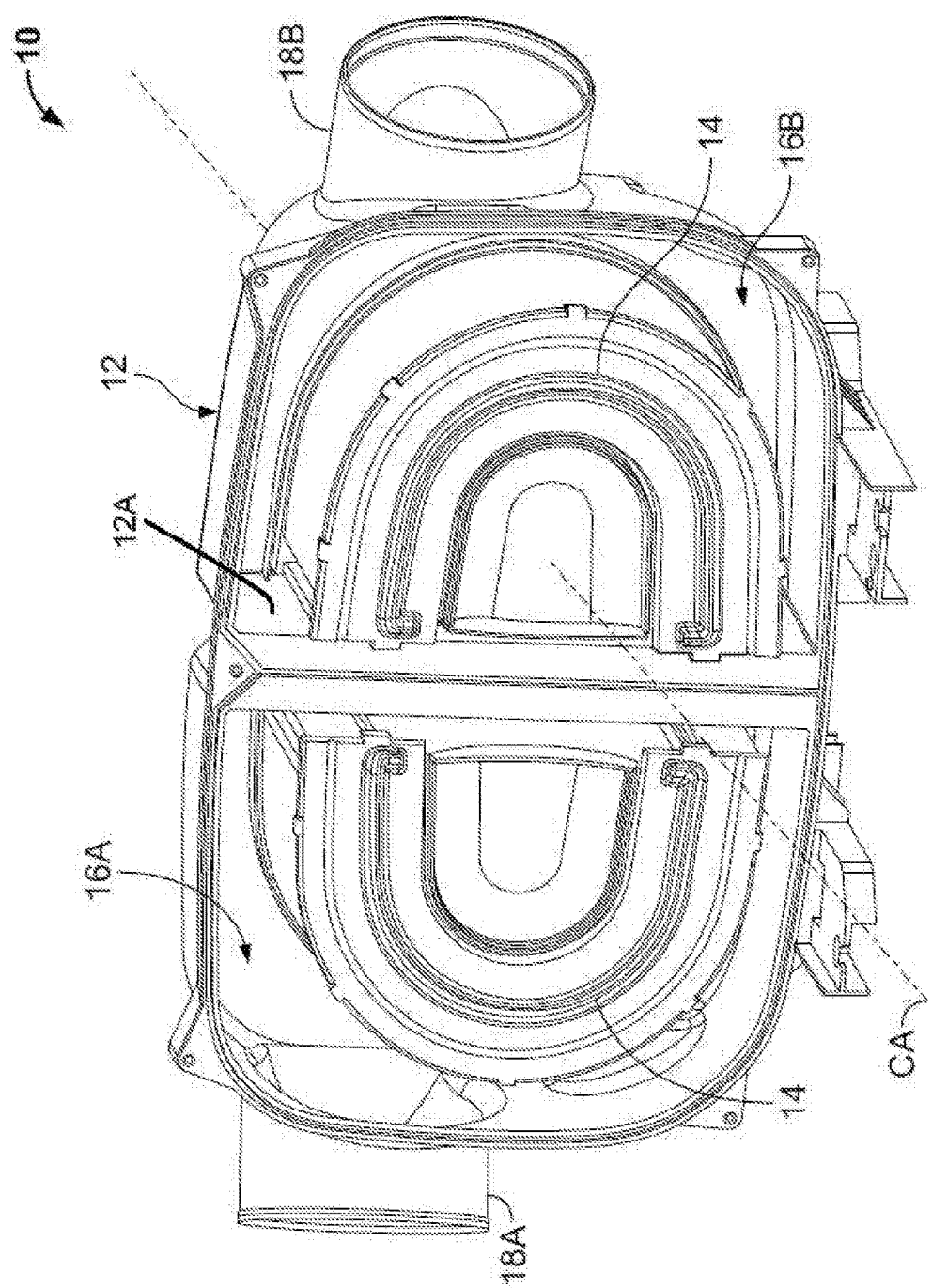
FIG. 3 is a top perspective view similar to FIG. 2, the air filter assembly for a motor vehicle shown with a lower cover removed for purposes of illustration.

Example embodiments will now be described more fully with reference to the accompanying drawings.

With reference to FIGS. 1 through 8 of the drawings, an air filter assembly for filtering a fluid constructed in accordance with the present teachings is illustrated and generally identified at reference character 10. In one particular application, the air filter assembly 10 is particularly adapted to filter air delivered to a combustion engine of a motor vehicle (not particularly shown). It will be appreciated, however, that the scope of the present teachings are not so limited and may readily be adapted for non-vehicle applications.

Figure 4:
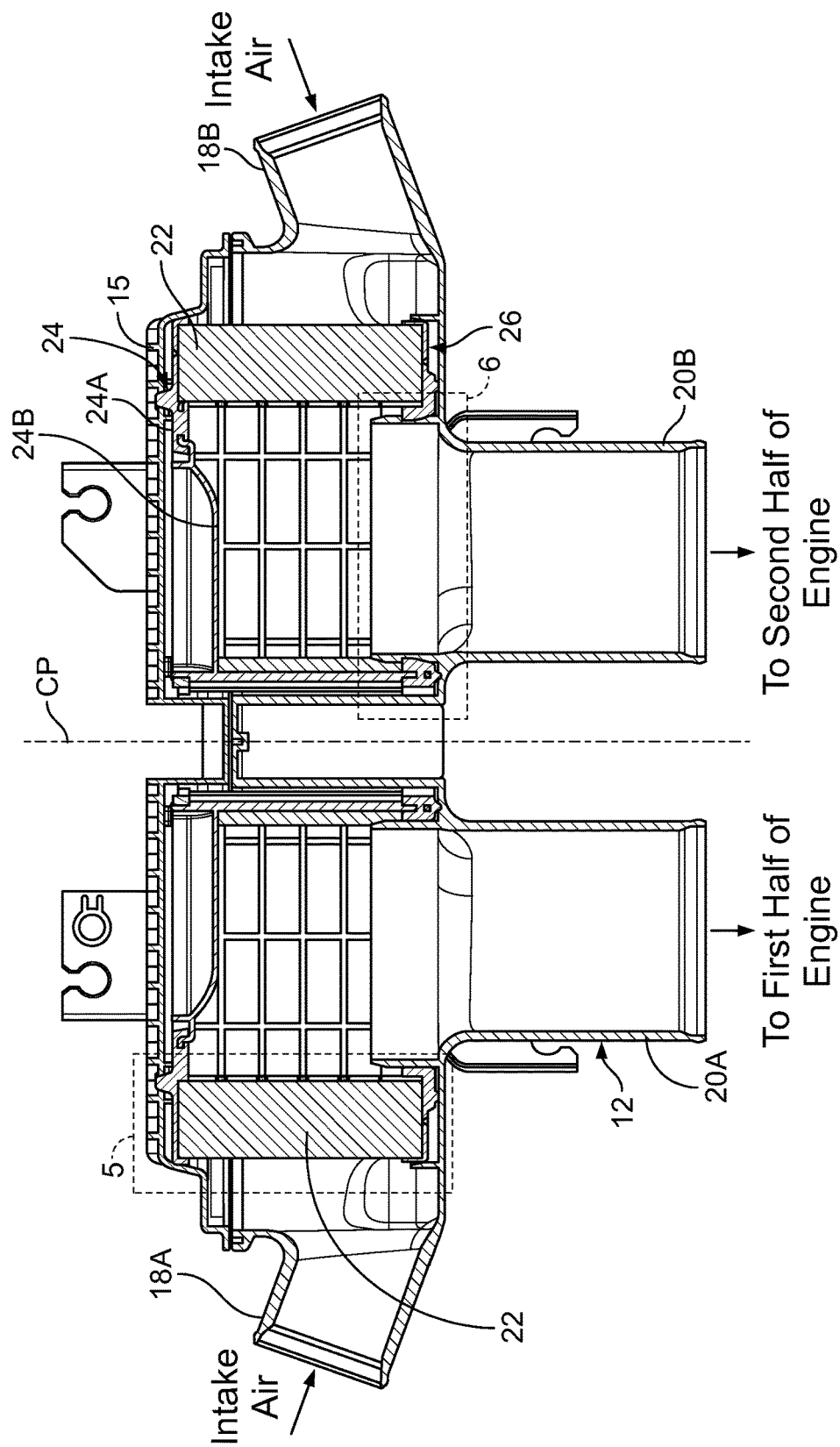
FIG. 4 is a cross-sectional view taken through the air filter assembly for a motor vehicle of FIG. 1.

In the embodiment illustrated, the air filter assembly 10 is illustrated to generally include a common housing 12, a pair of filter elements 14, and a common cover 15. The air filter assembly 10 may be a mirror image about a centerplane CP. As shown in FIG. 4, the centerplane CP extends into the page. Given the similar construction of the two halves (i.e., either to the left or right of the centerplane CP as shown in FIG. 4) of the air filter assembly 10, some details of the present teachings may only be described herein with reference to one of the halves of the air filter assembly 10. It will be understood, however, that the two halves of the air filter assembly 10 are substantially identical to any extent not otherwise described.

The common housing 12 defines a first airflow chamber 16A or first air-filtering chamber 16A extending between a first inlet duct 18A and a first outlet duct 20A. The common housing 12 further defines a second airflow chamber or second air-filtering chamber 16B extending between a second inlet duct 18B and a second outlet duct 20B. The first and second airflow chambers 16A and 16B are fluidly separated by a partition wall 12A (see FIG. 3) such that airflow entering the first inlet duct 18A and exiting the first outlet duct 20A does not mix with airflow entering the second inlet duct 18B and exiting the second outlet duct 20B. Intake air is drawn into the housing 12 through the first and second inlet ducts 18A and 18B. These two distinct airflows exit the housing 12 through the first and second outlet ducts 20A and 20B and are directed to first and second halves of an internal combustion engine, respectively.

The filter elements 14 are replaceable with the common housing 12 as units. Both of the filter elements 14 are illustrated to generally include a filter media 22, first and second end caps 24 and 26, and an end plate 28. In the embodiment illustrated, the filter media 22 may be an arcuate filter media 22 extending from a first media end 22A to a second media end 22B. As the term "arcuate" is used herein, it will be understood that the filter media 22 is curved along at least most of its length as it extends from the first media end 22A to the second media end 22B. It will be further understood, however, that the term "arcuate" does not require the filter media 22 to curve along its entire length. For example, the filter media 22 may linearly extend proximate the first media end 22A, the second media end 22B, or both ends 22A and 22B. As such, the filter media 22 may have a generally U-shape. The U-shaped filter media 22 may have an open side. Alternatively, the filter media 22 may have any other shape including at least one arcuate segment and extending between the first and second media ends 22A and 22B.

The filter media may be a pleated filter media 22 and may be constructed of any suitable material known in the art. For example, the filter media 22 may be cellulose or a cellulose/synthetic blend. The filter media 22 may be comprised of cellulose, meltblown fibers, microfibers or nanofibers, woven or knitted fibers, of a nonwoven or a combination of these materials. The filter media 22 may include one or more synthetic spun bond or melt blown fiber layers. The synthetic fiber layer may be selected from a group consisting of polybutylene terephthalate, polycarbonate, polypropylene, polyamide, polyethylene terephthalate, polyvinyl alcohol, polyvinyl nitrate, polyvinyl acetate, polyvinyl halide, polyester, polyalcylene terephthalate, polyalkylene naphthalate and polyurethane.

The end plate 28 and the filter media 22 of each filter element 14 may cooperate to define a generally D-shaped filter element 14. The arcuate filter media 22 at least partially surrounds a central axis CA (see FIG. 3). The central axis CA extends parallel to an axial direction and perpendicular to a radial direction as those terms are used herein.

The arcuate filter media 22 has a first or radially outer flow face 22C and a second or radially inner flow face 22D. The arcuate filter media 22 additionally includes first and second axial end faces 22E and 22F. One of the radially outer flow face 22C and the radially inner flow face is an inflow face 22D for receiving fluid to be filtered and the other of the radially outer flow face 22C and the radially inner flow face 22D is an outflow face for fluid filtered by the filter media 22. In the embodiment illustrated, the radially outer flow face 22C is the inflow face and the radially inner flow face 22D is the outflow face.

The radially inner flow face 22C at least partially surrounds an interior flow chamber 30 of the filter element 14. As will be addressed further below, the end plate 28 extends between the first and second media ends 22A and 22B. The arcuate filter media 22 and the end plate 28 cooperate to close the interior flow chamber 30 in a radial direction.

Figures 7, 8:
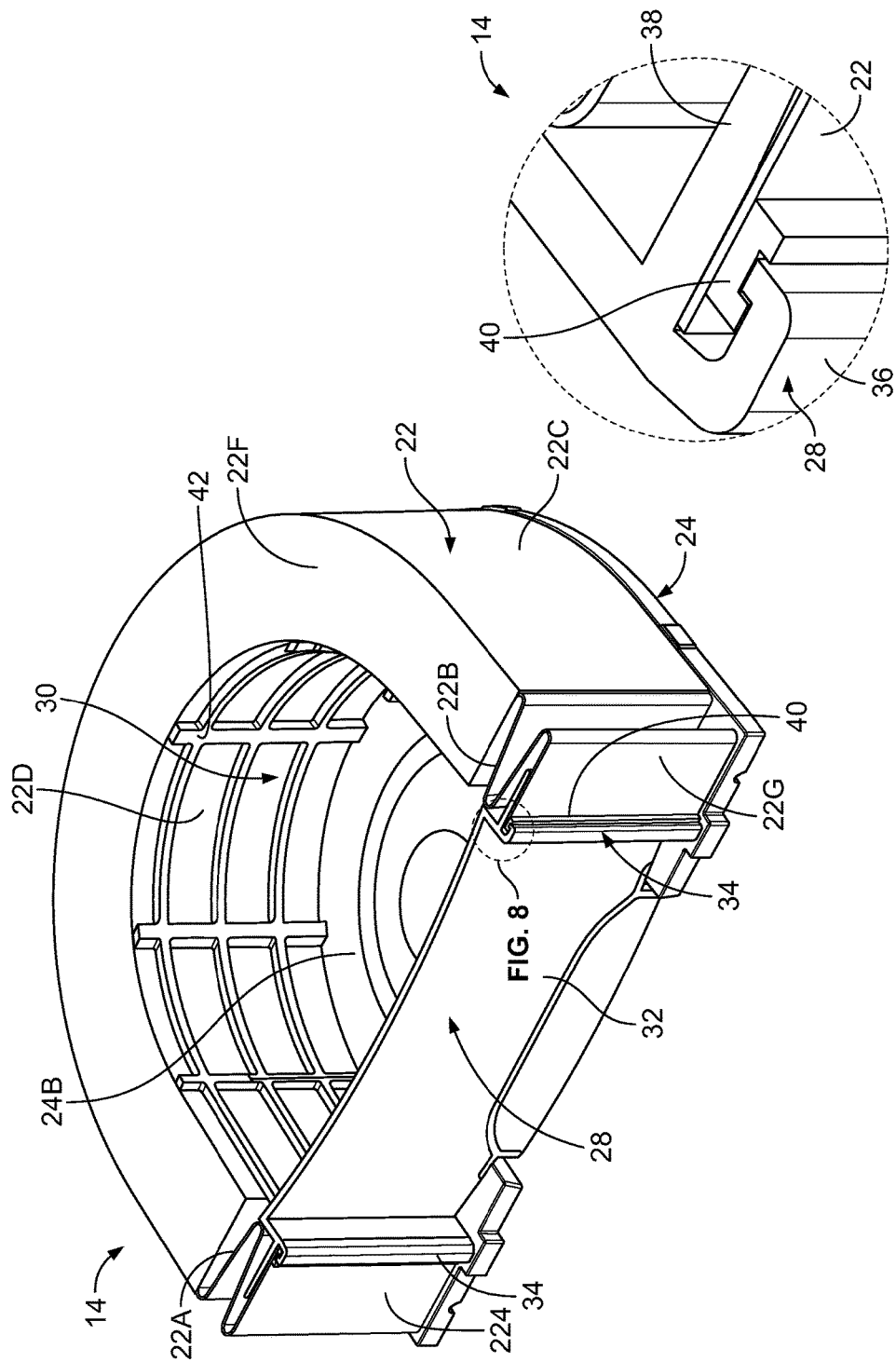
FIG. 7 is a bottom perspective view of one of the air filter elements of the air filter assembly of FIG. 1 removed from the air filter assembly for purposes of illustration.
FIG. 8 is an enlarged view of the detail shown in Area 8 of FIG. 7.

As shown most particularly in FIGS. 7 and 8, the end plate 28 may include a generally planar central portion 32 and a pair of substantially identical end portions 34. Each end portion 34 is illustrated to include a C-shaped segment 36 which opens in a direction facing the respective first or second media end 22A or 22B. Each end 34 further includes a flange 38. Each flange 38 extends generally parallel to the respective one of the first and second media ends 22A and 22B. An end-most panel 22G or 22H of the pleated filter media 22 is captured between a free end of the C-shaped segment 36 and the flange 38 with a clip 40. The clip 40 may be U-shaped in cross section. The end-most panel 22G or 22H of the pleated filter media 22 may be first glued to the flange 38 of the end plate 28 and the U-shaped clip 40 may be subsequently installed in an interference fit to maintain a media retention. The end plate 28 may be constructed of plastic or any other suitable material.

The first end cap 24 may be a closed end cap for axially closing a first axial end of the filter element 14. The first end cap 24 may include a first portion 24A arranged on the first axial end face 22E of the filter media 22 and may be constructed of polyurethane or any other suitable material. The first portion 24A of the first end cap 24 may have a U-shape corresponding to the shape of the filter media 22. The first portion 24A may be molded directly to the filter media 22 and may be formed in one piece and of the same material as first end cap 24.

The first end cap 24 may additionally include a second portion or central portion 24B. The second portion 24B may be generally perpendicular to the central portion 32 of the end plate 28. In the embodiment illustrated, the central portion 24B of the first end cap 24 may be unitarily formed with the end plate 28. In one application, the central portion 24B and the end plate 28 may be unitarily formed of plastic material. In certain embodiments, the central portion 24B and the end plate 28 may be advantageously formed as a one-piece injection molded component. The first portion 24A and/or end cap 24 may be sealably closed over and molded onto the central portion 24B and the end plate 28. The central portion 24B, end plate 28 and first portion 24A cooperate to sealably close over the interior of the filter element 14.

As shown in the cross-section view of FIG. 4, the first portion 24A of the first end cup 24 may be molded to extend over the first axial end face 22E in both radial directions. In an outward radial direction, the first portion 24A has an outer lip downwardly extending adjacent to the radially outer flow face 22C. In an inwardly radial direction, the first portion 24A is molded around an outer peripheral edge of the second portion 24B. The first portion 24A is also molded around an upper edge of the end panel 28.

At least one of the first and second end caps 24 and 26 may include an axially projecting elastic seal ridge of elastic sealing material. The first portion 24A of the first end cap 24 may be formed to include a first axially projecting seal 24C. The first axial projecting seal 24C may project axially upward from the first end cap 24 and may be positioned directly above a support cage 42 positioned adjacent to the radially inner flow face 22D. The first axially projecting seal 24C may be compressed by the common cover 15 and seal the arcuate filter media 22 relative to the cover 15.

The second end cap 26 may be an open end cap that permits air to flow into or leave the interior flow chamber 30. The second end cap 26 may have a U-shape corresponding to the shape of the filter media 22. The second end cap 26 may be molded to the filter media 22. The end cap 22 may be molded to extend over the second axial end face 22F in both radial directions. In this regard, the second end cap 22 may include inner and outer lips upwardly extending adjacent to the radially inner and outer flow faces 22D and 22C, respectively. In one application, the second end cap 26 may be constructed of polyurethane or an elastic rubber-like material.

The second end cap 26 may be formed to include an annular sealing lip 26B on a radial inner side of the second end cap 26. The annular sealing lip 26B may include a second axially projecting seal 26A. The second axially projecting seal 26A is configured to form a seal between the filter element 14 and the common housing 12. The annular sealing lip 26B of the second end cap 26 may additionally include a radial seal 26C between the arcuate filter element 14 and one of the inlet and outlet ducts 18A, 18B And 20A, 20B. As illustrated, the radial seal 26C is between the filter element 14 and the corresponding outlet duct 20A or 20B. Preferably the second end cap includes an outer axially extending lip 26E formed on the circumference second end cap 26 and extending from the second end cap 26 axially over a radially outer portion of the filter media 22. The outer axially extending lip 26E may be configured to abut against a portion of the housing to support compression of the radial seal 26C against the respective outlet ducts 20A, 20B. Preferably the outer axially extending lip 26E, the annular sealing lip 26B and the radial seal 26C extend circumferentially and close radially about the respective outlet ducts 20A, 20B, extending on the second axial end face 22F of the filter media 22 and continuing across an axial end of the end plate 28 in a continuous, circumferentially closed fashion.

In use, the filter elements 14 are removably placed in the first and second airflow chambers 16A and 16B. Insertion of the filter elements 14 into the housing 12 establishes a primary radial seal between the second end caps 26 and the respective outlet ducts 20A and 20B at radial seals 26C. The cover 15 may be secured to the housing 12 with suitable fasteners to axially compress axial seals 24C and 26A. A first flow of intake air enters the housing 12 through the first inlet ducts 18A, passes radially through the associated filter media 22 into the first airflow chamber 16A, exits the housing 12 through the first outlet duct 20A, and is directed to a first half of an internal combustion engine. Correspondingly, a second, separate and distinct flow of intake air enters the housing 12 through the second inlet duct 18B, passes radially through the associated filter media 22 into the second airflow chamber 16B, exits the housing 12 through the second outlet duct 20B, and is directed to a second half of the internal combustion engine.

It will now be appreciated that the present teachings provide an air filter assembly utilizing a single air cleaner housing defining two completely separate air cleaner chambers. Each airflow chamber has a filter element. Airflow is divided between the separate air cleaner chambers to thereby improve MAF performance by reducing airflow variability. The present teachings may reduce costs by utilizing a single housing and two filters. The present teachings may also reduce packaging requirements within a motor vehicle. Dividing the airflow will reduce variability which otherwise negative affects MAF and may reduce a conventional need for airflow straighteners.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An air filter assembly for a motor vehicle comprising:
a common housing defining
a first airflow chamber extending between a first inlet duct and a first outlet duct,
a second airflow chamber extending between a second inlet duct and a second outlet duct,
the first airflow chamber is completely fluidly separated from the second airflow chamber by a partition wall closing between and separating the first airflow chamber and the second airflow chamber;
a first D-shaped filter element disposed in the first airflow chamber for filtering air passing through the first airflow chamber;
a second D-shaped filter element disposed in the second airflow chamber for filtering air passing through the second airflow chamber; and
a common cover secured to the common housing and closing the first airflow chamber and the second airflow chamber.

2. The air filter assembly of claim 1, wherein
the first and second D-shaped filter elements are both defined by a U-shaped filter media extending between a first end and a second end and an end plate extends between the first and second ends.

3. The air filter assembly of claim 1, wherein
airflow from the first and second inlet ducts radially passes through the respective U-shaped filter media and axially exits the common housing through the first and second outlet ducts, respectively.

4. The air filter assembly of claim 2, wherein
the U-shaped filter media of both of the first and second D-shaped filter elements includes an open side, the open sides oriented to face one another.

5. The air filter assembly of claim 2, wherein
both of the filter elements include an open end cap molded to and closing a first axial side of a respective U-shaped filter media.

6. The air filter assembly of claim 5, wherein
both of the filter elements further include a closed end cap including a portion molded to and closing a second axial side of the respective U-shaped filter media.

7. The air filter assembly of claim 6, wherein
each closed end cap further includes
a central portion closing an interior of the respective D-shaped filter element,
each central portion integrally formed with a respective one of the end plates.

8. The air filter assembly of claim 2, wherein
each D-shaped filter element includes
a support cage positioned adjacent to an interior radial side of the respective U-shaped filter media.

9. The air filter assembly of claim 8, wherein
both of the filter elements include
an end cap molded to and closing a first axial side of the respective U-shaped filter media,
each end cap including an axial sealing portion axially between the support cage and the common housing.

10. An air filter element comprising:
an arcuate U-shaped filter media having:
a first media end;
an opposed second media end spaced axially away from the first media end, forming a U-shaped filter media therebetween;
wherein the U-shaped filter media has an open top end, at an open end of the "U" shape, arranged between and bounded by the first media end and the opposed second media end;
a closed end plate arranged at the open top end of the U-shaped filter media, the closed end plate connected to and extending from the first media end to the opposed second media end, the end plate closing off the open top end of the U-shaped filter media, such that the U-shaped filter media and the closed end plate cooperate to circumferentially close around an interior flow chamber of a "U" formed by the U-shaped filter media, forming a radially closed D-shaped filter element;
wherein the air filter element radially receives airflow through the arcuate filter media into the interior flow chamber and axially directs the airflow out of the air filter element.

11. The air filter element of claim 10, wherein
the U-shaped filter media and the end plate cooperatively define a closed D-shape for radially receiving airflow from an inlet duct and axially directing the airflow to an outlet duct.

12. The air filter element of claim 10, wherein
the U-shaped filter media is a pleated filter media.

13. The air filter element of claim 12, wherein
the closed end plate includes
   a generally planar central portion,
   a first end plate end attached to a first end pleat at the first media end of the pleated filter media and
   a second end plate end attached to a second end pleat at the opposed second media end of the pleated filter media.

14. The air filter element of claim 10, further comprising
an arcuate support cage arranged in the interior flow chamber, adjacent to a radially inner side of the arcuate filter media.

15. The air filter element of claim 10, further comprising
an open end cap molded to and closing a first axial side of the U-shaped filter media, the open end cap having a flow opening, opening into the interior flow chamber.

16. The air filter element of claim 15, further comprising
a closed end cap including a U-shaped portion molded to and closing a second axial side of the U-shaped filter media, such that the U-shaped filter media is sandwiched between the open end cap and the closed end cap, such that the interior flow chamber opens to an exterior of the air filter element only through the open end cap.

17. The air filter element of claim 10, in combination with an air filter assembly including a housing defining an airflow chamber extending between an inlet duct and an outlet duct, the arcuate filter media disposed in the airflow chamber for filtering air passing through the housing.

18. A method of filtering air delivered to an internal combustion engine, the method comprising:
   providing a housing defining first and second airflow chambers, the first and second airflow chambers being completely fluidly separated from each other by a partition wall, the first airflow chamber in communication with a first inlet duct and a first outlet duct, the second airflow chamber in communication with a second inlet duct and a second outlet duct;
   removably disposing a first air filter element according to claim 10 having a first arcuate U-shaped filter media in the first airflow chamber and a second filter element according to claim 10 having a second arcuate U-shaped filter media in the second airflow chamber;
   passing a first flow of air from the first inlet duct, radially through the first arcuate U-shaped filter media and into an open interior of the first filter element;
   passing a second, separate flow of air from the second inlet duct radially through the second arcuate U-shaped filter media and into an open interior of the second filter element;
   axially delivering the first airflow from the first air filter element and the first outlet duct; and
   axially delivering the second airflow from the second air filter element and the second outlet duct.

19. The method of filtering air delivered to an internal combustion engine of claim 18, wherein
the first and second separate airflows reduce variability of a combined airflow delivered to the internal combustion engine.

20. An arcuate filter element for filtering a fluid, the arcuate filter element comprising:
   an arcuate U-shaped filter media having:
      a first media end;
      an opposed second media end spaced axially away from the first media end, forming an approximate U-shape therebetween,
      wherein the U-shaped filter media is formed by:
         a first filter media leg extending linearly from the first media end;
         a second filter media leg extending linearly from the second media end;
         an arcuate filter media section, extending from an opposite end of the first filter media leg to an opposite end of the second filter media leg;
      wherein the U-shaped filter media has an open top end, arranged between and bounded by the first media end and the opposed second media end;
   a closed end plate arranged at the open top end of the U-shaped filter media, the closed end plate connected to and extending from the first media end to the opposed second media end, the end plate closing off the open top end of the U-shaped filter media, such that the U-shaped filter media and the closed end plate cooperate to circumferentially close around an interior flow chamber of a "U" formed by the U-shaped filter media, radially enclosing the interior flow chamber and forming a radially closed D-shaped filter element;
   wherein the arcuate filter media at least partially surrounds a central axis,
   the central axis extending parallel to an axial direction and perpendicular to a radial direction,
   the arcuate filter media having a radially outer flow face and a radially inner flow face, the radially inner flow face at least partially surrounds an interior flow chamber of the arcuate filter element,
   wherein one of the radially outer flow face and the radially inner flow face is an inflow face for receiving fluid to be filtered and the other of the radially outer flow face and the radially inner flow face is an outflow face for filtered fluid;
   a first end cap arranged on a first axial end face of the arcuate filter media;
   a second end cap arranged on a second axial end face of the arcuate filter media;
   wherein the interior flow chamber is open at the second end face permitting fluid flow to enter or leave the interior flow chamber.

21. The arcuate filter element of claim 20, wherein
the interior flow chamber is closed at the first axial end face by at least one of the first end cap and the end plate.

22. The arcuate filter element of claim 20, wherein
at least one of the first end cap and the second end cap includes an axially projecting elastic seal ridge of elastic sealing material.

23. The arcuate filter element of claim 20, wherein
at least one of the first end cap and the second end cap includes an elastic sealing material configured to form a seal between the arcuate filter element and a filter housing into which the arcuate filter element is removably installable.

24. The arcuate filter element of claim 23, wherein
the elastic sealing material extends from the at least one of the first end cap and the second end cap onto a respective axial end of the end plate for forming a seal member between the arcuate filter element and a filter housing into which the arcuate filter element is installable.

25. The arcuate filter element of claim 24, wherein:
a continuous annular sealing lip is formed on a radially inner side of the seal member, the annular sealing lip extending radially inwardly within the filter element towards the interior flow chamber; and
wherein the annular sealing lip is further configured to form a radial seal between the arcuate filter element and one of an inlet duct and an outlet duct of a filter housing into which the arcuate filter element is installable.

* * * * *